US012742703B2

(12) United States Patent
Kamakura

(10) Patent No.: US 12,742,703 B2
(45) Date of Patent: Sep. 22, 2026

(54) POWER DETERMINATION APPARATUS AND POWER DETERMINATION METHOD

(71) Applicant: ISUZU MOTORS LIMITED, Yokohama (JP)

(72) Inventor: Sei Kamakura, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 366 days.

(21) Appl. No.: 18/409,540

(22) Filed: Jan. 10, 2024

(65) Prior Publication Data

US 2024/0264041 A1 Aug. 8, 2024

(30) Foreign Application Priority Data

Feb. 7, 2023 (JP) ................................ 2023-016873

(51) Int. Cl.
*B60T 7/12* (2006.01)
*G01M 15/05* (2006.01)

(52) U.S. Cl.
CPC .................................. *G01M 15/05* (2013.01)

(58) Field of Classification Search
CPC ............... B60W 10/06; F01N 2610/02; B60Y 2200/92; F02D 2250/18; F02D 2200/101
USPC .......................................................... 701/104
See application file for complete search history.

(56) References Cited

U.S. PATENT DOCUMENTS 9,080,489 B2 * 7/2015 Onodera ................... F01N 9/00
9,181,831 B2 * 11/2015 Wakamatsu ............. F01N 3/18
10,710,572 B2 * 7/2020 Goek ....................... B60K 6/12
11,628,821 B2 * 4/2023 Tabata ................... B60K 6/387 701/70
2018/0162350 A1 6/2018 Kim
2019/0292961 A1 * 9/2019 Uchiyama ............ F01N 11/007
2019/0293617 A1 * 9/2019 Uchiyama ............. G01N 31/10

FOREIGN PATENT DOCUMENTS

| | | |
|---|---|---|
| DE | 10 2015 201 905 A1 | 8/2016 |
| DE | 10 2015 204 093 A1 | 9/2016 |
| JP | 2004-092456 A | 3/2004 |
| JP | 2010-090723 A | 4/2010 |
| JP | 2011-051383 A | 3/2011 |
| JP | 2011-051542 A | 3/2011 |
| JP | 2015-051743 A | 3/2015 |
| JP | 2019-166943 A | 10/2019 |

* cited by examiner

*Primary Examiner* — Logan M Kraft
*Assistant Examiner* — James J Kim
(74) *Attorney, Agent, or Firm* — PROCOPIO, CORY, HARGREAVES & SAVITCH LLP

(57) ABSTRACT

A power determination apparatus includes a determination part that determines a first injection correction amount of a fuel injection quantity of an engine and a first torque correction amount of motor torque generated by a motor, a specification part that specifies a first correction coefficient for correcting the first injection correction amount and the first torque correction amount, and a calculation part that calculates i) a corrected injection quantity, obtained by subtracting a second injection correction amount, which is obtained by multiplying the first injection correction amount by the first correction coefficient, from the fuel injection quantity and ii) a corrected torque, obtained by adding a second torque correction amount, which is obtained by multiplying the first torque correction amount by the first correction coefficient, to the motor torque.

9 Claims, 5 Drawing Sheets

ACCELERATOR
OPENING DEGREE
A1

A0
TIME
T0 T1 T2
INJECTION
QUANTITY
N-N2
N-N1

N0
TIME
T0 T1 T2
TORQUE
Q+Q1

Q+Q2
Q0
TIME
T0 T3 T1 T4 T2

POWER DETERMINATION APPARATUS AND POWER DETERMINATION METHOD

CROSS-REFERENCE TO RELATED APPLICATIONS

The present application claims priority to Japanese Patent Application number 2023-016873, filed on Feb. 7, 2023, contents of which are incorporated herein by reference in its entirety.

BACKGROUND OF THE INVENTION

The present disclosure relates to a power determination apparatus and a power determination method.

A conventional controller for a hybrid vehicle cools a catalyst to maintain a capacity of the catalyst to purify nitrogen oxide (NOx) if torque is not required for an engine (for example, Japanese Unexamined Patent Application Publication No. 2015-51743).

In a conventional control apparatus for a hybrid vehicle, even if the catalyst can purify the amount of NOx emitted due to operation of the engine in response to an accelerator stepping amount, the amount of power supplied to a motor becomes large because the motor is required to generate torque to suppress NOx emissions.

BRIEF SUMMARY OF THE INVENTION

The present disclosure focuses on this point, and an object thereof is to request that a motor generate torque suitable for an amount of NOx generated.

MEANS FOR SOLVING THE PROBLEMS

A power determination apparatus of a first aspect of the present disclosure includes a determination part that determines a first injection correction amount of a fuel injection quantity of an engine and a first torque correction amount of motor torque generated by a motor, on the basis of an accelerator opening degree and an engine speed, a specification part that specifies a first correction coefficient for correcting the first injection correction amount and the first torque correction amount on the basis of a temperature of a catalyst and an ammonia adsorption amount of the catalyst, and a calculation part that calculates i) a corrected injection quantity, obtained by subtracting a second injection correction amount, which is obtained by multiplying the first injection correction amount by the first correction coefficient, from the fuel injection quantity and ii) a corrected torque, obtained by adding a second torque correction amount, which is obtained by multiplying the first torque correction amount by the first correction coefficient, to the motor torque.

A power determination method includes the steps of determining a first injection correction amount of a fuel injection quantity of an engine and a first torque correction amount of motor torque generated by a motor, on the basis of an accelerator opening degree and an engine speed, and specifying a first correction coefficient for correcting the first injection correction amount and the first torque correction amount, on the basis of temperature of a catalyst and an ammonia adsorption amount of the catalyst, and calculating i) a corrected injection amount, obtained by subtracting a second injection correction amount, which is obtained by multiplying the first injection correction amount by the first correction coefficient, from the fuel injection quantity and ii) a corrected torque, obtained by adding a second torque correction amount, which is obtained by multiplying the first torque correction amount by the first correction coefficient, to the motor torque.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

<Overview of Power Determination Apparatus 10>

Figure 1:
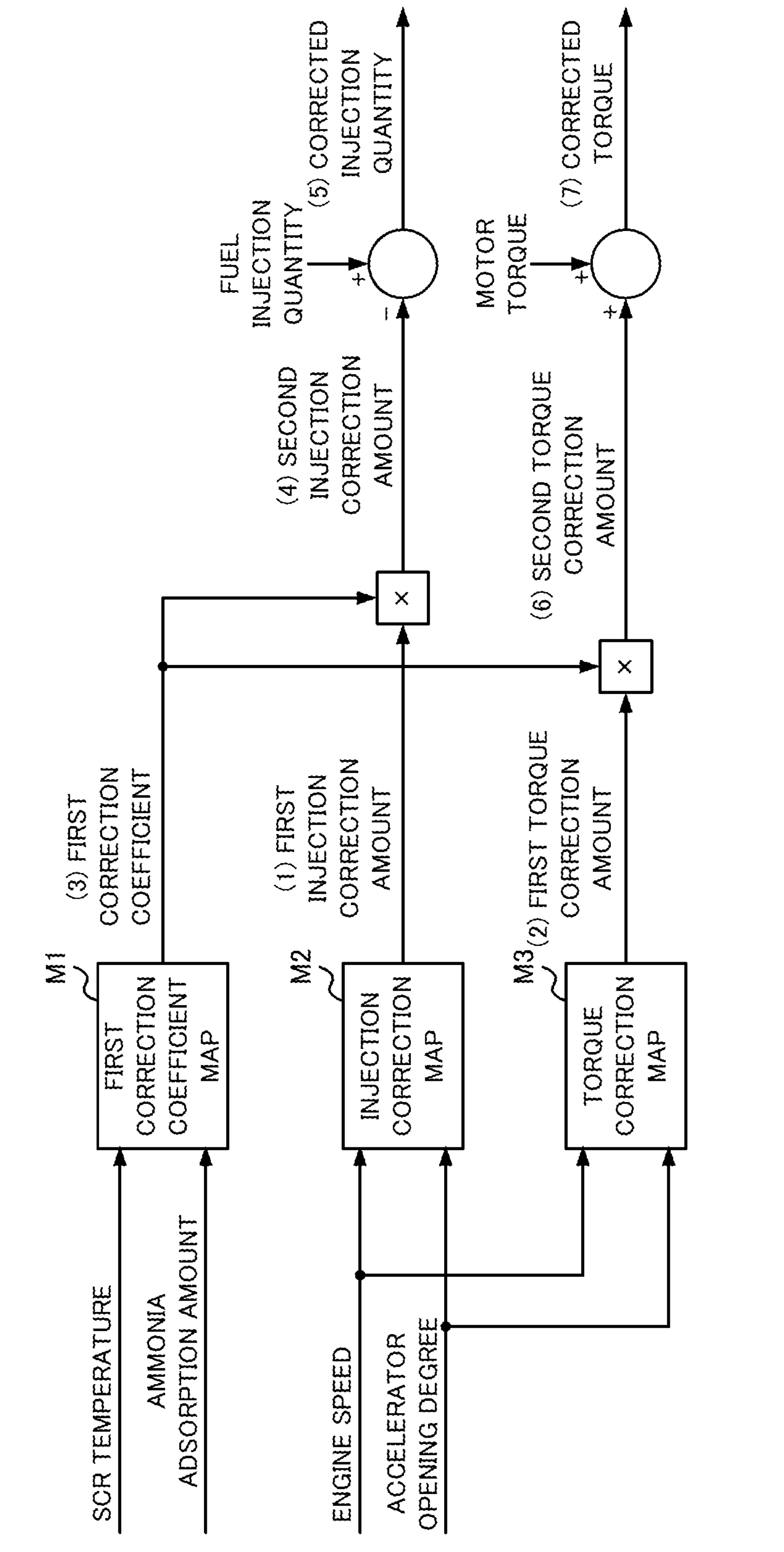
FIG. 1 illustrates an overview of a power determination apparatus 10 according to the present embodiment.

FIG. 1 illustrates an overview of a power determination apparatus 10 according to the present embodiment. The power determination apparatus 10 is installed in a hybrid vehicle (hereinafter referred to as a "vehicle"), and has a function of determining a fuel injection quantity of an engine and a torque generated by a motor (hereinafter referred to as a "motor torque"). Further, when an accelerator is stepped on, the power determination apparatus 10 determines a corrected injection quantity obtained by correcting the fuel injection quantity and a corrected torque obtained by correcting the motor torque, and causes the engine to inject fuel at the corrected injection quantity and causes the motor to generate the corrected torque. It should be noted that, "stepping on an accelerator" in the present embodiment indicates either a driver stepping on an accelerator pedal to accelerate a vehicle, or an automatic driving control apparatus (not shown in figures) of a vehicle during automatic driving outputting an accelerator opening degree determined to accelerate the vehicle to the power determination apparatus 10.

The operation for determining the corrected injection quantity and the corrected torque will be described below.

First, the power determination apparatus 10 acquires an engine speed and an accelerator opening degree. The power determination apparatus 10 then determines a first injection correction amount corresponding to the engine speed and the accelerator opening degree, by referencing an injection correction map M2 ((1) shown in FIG. 1). The power determination apparatus 10 determines a first torque correction amount corresponding to the engine speed and the accelerator opening degree, by referencing a torque correction map M3 ((2) shown in FIG. 1).

When the vehicle travels at an acceleration corresponding to an accelerator stepping amount (so-called rapid acceleration) due to the accelerator being stepped on, the vehicle may travel without increasing the amount of NOx emissions by causing the motor to generate torque corresponding to said acceleration. That is, the vehicle can travel at the acceleration corresponding to the accelerator stepping amount without increasing the amount of the NOx emissions by i) adding the first torque correction amount to the motor torque corresponding to the accelerator opening degree and ii) subtracting the first injection correction amount from the fuel injection quantity corresponding to the accelerator opening degree. However, if a Selective Catalytic Reduction (SCR) can purify NOx generated by a quantity of injected fuel corresponding to the acceleration, it is possible to suppress power consumption by causing the engine to inject fuel rather than causing the motor to generate torque.

Therefore, the power determination apparatus 10 acquires a temperature of the SCR and an ammonia adsorption amount of the SCR. The power determination apparatus 10 then specifies a first correction coefficient corresponding to the temperature and the ammonia adsorption amount of the SCR and indicating a value greater than or equal to 0 and less than 1, by referencing a first correction coefficient map M1 ((3) shown in FIG. 1).

Subsequently, the power determination apparatus 10 calculates a second injection correction amount ((4) shown in FIG. 1), which is obtained by multiplying the first injection correction amount by the first correction coefficient, and calculates a corrected injection quantity ((5) shown in FIG. 1) obtained by subtracting the second injection correction amount from the fuel injection quantity corresponding to the accelerator opening degree. The power determination apparatus 10 calculates a second torque correction amount ((6) shown in FIG. 1), obtained by multiplying the first torque correction amount by the first correction coefficient, and calculates a corrected torque ((7) shown in FIG. 1) obtained by adding the second torque correction amount to the motor torque corresponding to the accelerator opening degree. That is, the power determination apparatus 10 calculates i) the corrected injection quantity, obtained by subtracting the second injection correction amount, which is smaller than the first injection correction amount, from the fuel injection quantity and ii) the corrected torque, obtained by adding the second torque correction amount, which is smaller than the first torque correction amount, to the motor torque.

The power determination apparatus 10 operates as above to i) reduce the correction amount to be subtracted from the fuel injection quantity corresponding to the accelerator opening degree and ii) reduce the correction amount to be added to the motor torque corresponding to the accelerator opening degree, when the accelerator is stepped on. As a result, it is possible to suppress the motor torque while the vehicle is driven at the acceleration corresponding to the accelerator stepping amount, and so the amount of electric power supplied to the motor can be suppressed. Further, using the first correction coefficient enables the engine to inject the fuel at the fuel injection quantity corresponding to an amount of generated NOx capable of being purified by the SCR, and therefore it is possible to suppress the amount of NOx emissions and cause the motor to generate the torque suitable for the amount of NOx generated.

The configuration and operation of the power determination apparatus 10 will be described in detail below.

<Configuration of Power Determination Apparatus 10>

Figure 2:
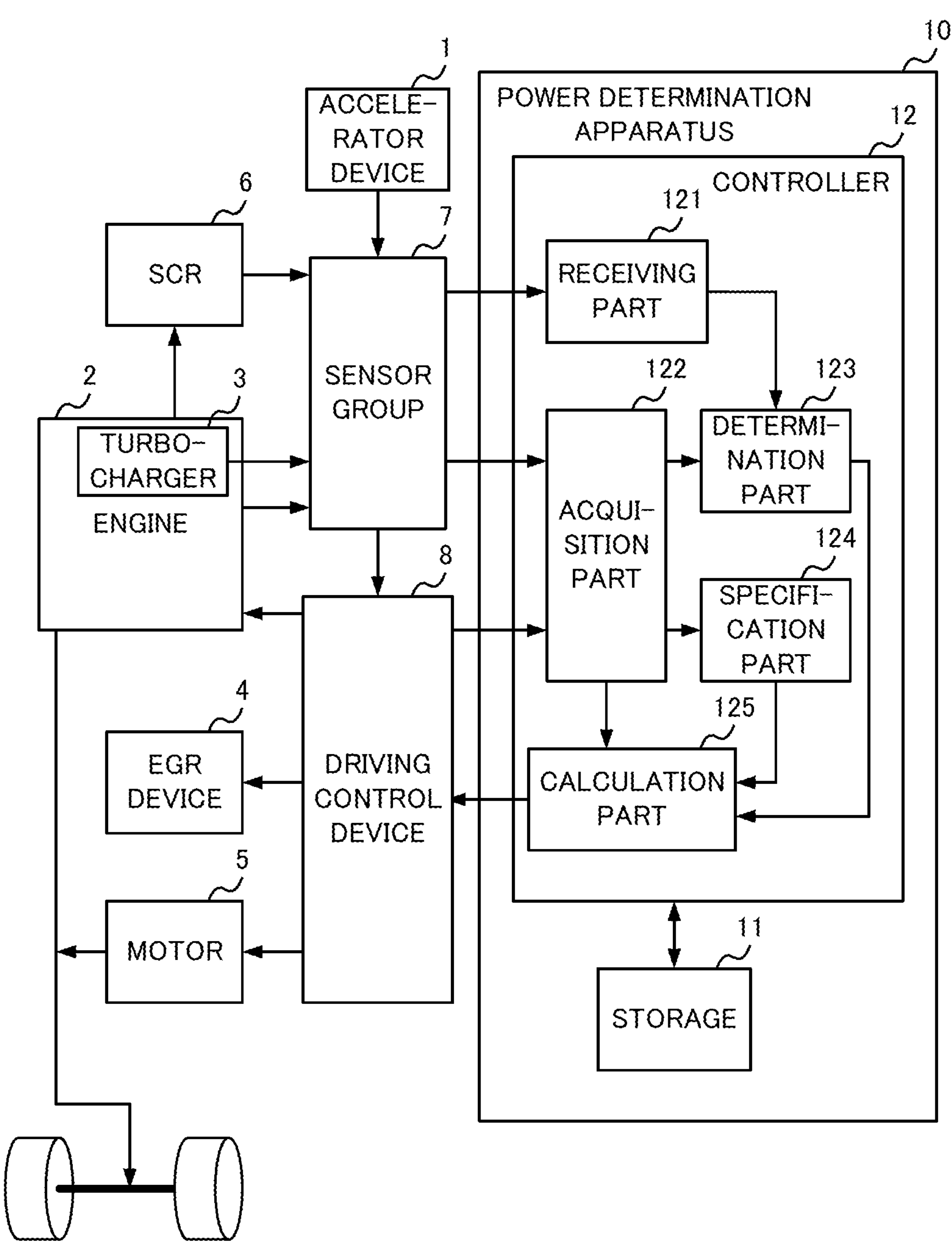
FIG. 2 shows a configuration of the power determination apparatus 10.

FIG. 2 shows a configuration of the power determination apparatus 10. The vehicle shown in FIG. 2 includes an accelerator device 1, an engine 2, a turbocharger 3, an Exhaust Gas Recirculation (EGR) device 4, a motor 5, an SCR 6, a sensor group 7, a driving control device 8, and a power determination apparatus 10. The power determination apparatus 10 includes a storage 11 and a controller 12.

The accelerator device 1 is a device for controlling acceleration of the vehicle. The accelerator device 1 includes an accelerator pedal, and outputs an accelerator opening degree corresponding to an amount that a driver of the vehicle steps on the accelerator pedal. When the vehicle is driven automatically, the accelerator device 1 outputs an accelerator opening degree corresponding to torque required by the automatic driving control apparatus included in the vehicle. The engine 2 is a power source for driving the vehicle. The turbocharger 3 compresses intake air flowing through an intake passage (not shown in figures) upstream of the engine 2, for example, by using a flow of exhaust air flowing through an exhaust passage (not shown in figures) downstream of the engine 2. The EGR device 4 includes a valve that can be opened and closed in an EGR passage, and the valve opening degree is controlled by the driving control device 8 to adjust an EGR gas amount. The motor 5 is a power source for driving the vehicle. The SCR 6 is a purification device (that is, a catalyst) that converts NOx in exhaust gas into harmless nitrogen through a reduction reaction.

The sensor group 7 includes a plurality of sensors such as an accelerator opening degree sensor, an engine speed sensor, a boost pressure sensor, and a temperature sensor for detecting the temperature of the SCR 6. The driving control device 8 is a device including a processor such as an Electronic Control Unit (ECU), and causes the processor to execute a program stored in a storage of the driving control device 8 to drive the vehicle equipped with the power determination apparatus 10. The driving control device 8 controls the motor 5 to generate the motor torque determined by the power determination apparatus 10, and controls the engine 2 to inject the fuel at the fuel injection quantity determined by the power determination apparatus 10. As will be described later, the driving control device 8 causes the motor 5 to generate the corrected torque determined by the power determination apparatus 10, and causes the engine 2 to inject the corrected injection quantity determined by the power determination apparatus 10.

The storage 11 includes a storage medium such as a Read Only Memory (ROM), a Random Access Memory (RAM), a Hard Disk Drive (HDD), or a Solid State Drive (SSD). The storage 11 stores a program executed by the controller 12. The storage 11 stores various types of information for determining the corrected injection quantity and the corrected torque. For example, the storage 11 stores the first correction coefficient map M1 (FIG. 1) showing the first correction coefficient corresponding to the temperature and the ammonia adsorption amount of the SCR 6, the injection correction map M2 (FIG. 1) showing the first injection correction amount corresponding to the engine speed and the accelerator opening degree, and the torque correction map M3 (FIG. 1) showing the first torque correction amount corresponding to the engine speed and the accelerator opening degree.

The controller 12 is, for example, a processor such as a Central Processing Unit (CPU) or an Electronic Control Unit (ECU). The controller 12 functions as a receiving part 121, an acquisition part 122, a determination part 123, a specification part 124, and a calculation part 125, by executing the program stored in the storage 11. It should be noted that the controller 12 may be formed of a single processor, or may be formed of a plurality of processors or a combination of one or more processors and an electronic circuit. The configuration of each unit implemented by the controller 12 will be described below.

The receiving part 121 receives the accelerator opening degree detected by the accelerator opening degree sensor. The acquisition part 122 acquires the engine speed, the fuel injection quantity of the engine, the motor torque generated by the motor 5, the temperature of the SCR 6, and the ammonia adsorption amount of the SCR 6.

For example, the acquisition part 122 acquires the engine speed detected by the engine speed sensor and the temperature of the SCR 6 detected by the temperature sensor. The acquisition part 122 estimates the ammonia adsorption amount of the SCR 6 on the basis of an amount of urea water injected into the SCR 6 by a urea water injection device (not shown in figures) provided in the vehicle to acquire the ammonia adsorption amount of the SCR 6. The acquisition part 122 acquires the fuel injection quantity and the motor torque corresponding to the accelerator opening degree specified by the driving control device 8. The fuel injection quantity corresponding to the accelerator opening degree is the fuel injection quantity corresponding to the torque of the engine 2 within the torque corresponding to the accelerator opening degree, and the motor torque corresponding to the accelerator opening degree is the torque generated by the motor 5 within the torque corresponding to the accelerator opening degree.

The determination part 123 determines the first injection correction amount of the fuel injection quantity on the basis of the engine speed and a magnitude of the accelerator opening degree. Specifically, the determination part 123 first acquires the injection correction map M2 stored in the storage 11. The injection correction map M2 is shown as a plane in two-dimensional space having an axis corresponding to the engine speed and an axis corresponding to the magnitude of the accelerator opening degree, and shows the injection correction amounts associated with the engine speed and the magnitude of the accelerator opening degree. The injection correction amount is a value determined by experiment or simulation. Subsequently, in the injection correction map M2, the determination part 123 specifies the injection correction amount associated with the engine speed acquired by the acquisition part 122 and the magnitude of the accelerator opening degree received by the receiving part 121, and determines the specified injection correction amount as the first injection correction amount.

The determination part 123 determines the first torque correction amount of the motor torque on the basis of the engine speed and the magnitude of the accelerator opening degree. Specifically, the determination part 123 first acquires the torque correction map M3 stored in the storage 11. The torque correction map M3 is shown as a plane in two-dimensional space having an axis corresponding to the engine speed and an axis corresponding to the magnitude of the accelerator opening degree, and shows the torque correction amounts associated with the engine speed and the magnitude of the accelerator opening degree. The torque correction amount is a value determined by experiment or simulation. Subsequently, in the torque correction map M3, the determination part 123 specifies the torque correction amount associated with the engine speed acquired by the acquisition part 122 and the magnitude of the accelerator opening degree received by the receiving part 121, and determines the specified torque correction amount as the first torque correction amount.

The specification part 124 specifies a first correction coefficient for correcting the first injection correction amount and the first torque correction amount on the basis of the temperature and the ammonia adsorption amount of the SCR 6. Specifically, the specification part 124 first acquires the first correction coefficient map M1 stored in the storage 11. The storage 11 stores the first correction coefficient map M1, which is shown as a plane in two-dimensional space having an axis corresponding to the temperature and an axis corresponding to the ammonia adsorption amount of the SCR 6 and shows a plurality of first correction coefficients indicating values greater than or equal to 0 and less than 1 associated with the temperature and the ammonia adsorption amount of the SCR 6. The first correction coefficient is a value determined by experiment or simulation. Subsequently, the specification part 124 specifies the first correction coefficient corresponding to the temperature and the ammonia adsorption amount of the SCR 6 acquired by the acquisition part 122 among the plurality of first correction coefficients included in the first correction coefficient map M1.

The calculation part 125 calculates the corrected injection quantity obtained by subtracting the second injection correction amount, which is obtained by multiplying the first injection correction amount by the first correction coefficient, from the fuel injection quantity corresponding to the accelerator opening degree. Further, the calculation part 125 calculates the corrected torque obtained by adding the second torque correction amount, which is obtained by multiplying the first torque correction amount by the first correction coefficient, to the motor torque corresponding to the accelerator opening degree. The calculation part 125 outputs the calculated corrected injection quantity and corrected torque to the driving control device 8. The calculation part 125 calculates a corrected injection quantity that is larger than the injection quantity obtained by subtracting the first injection correction amount from the fuel injection quantity corresponding to the accelerator opening degree, and calculates a corrected torque that is smaller than the torque obtained by adding the first torque correction amount to the motor torque corresponding to the accelerator opening degree, for example.

Figures 3A, 3B, 3C:
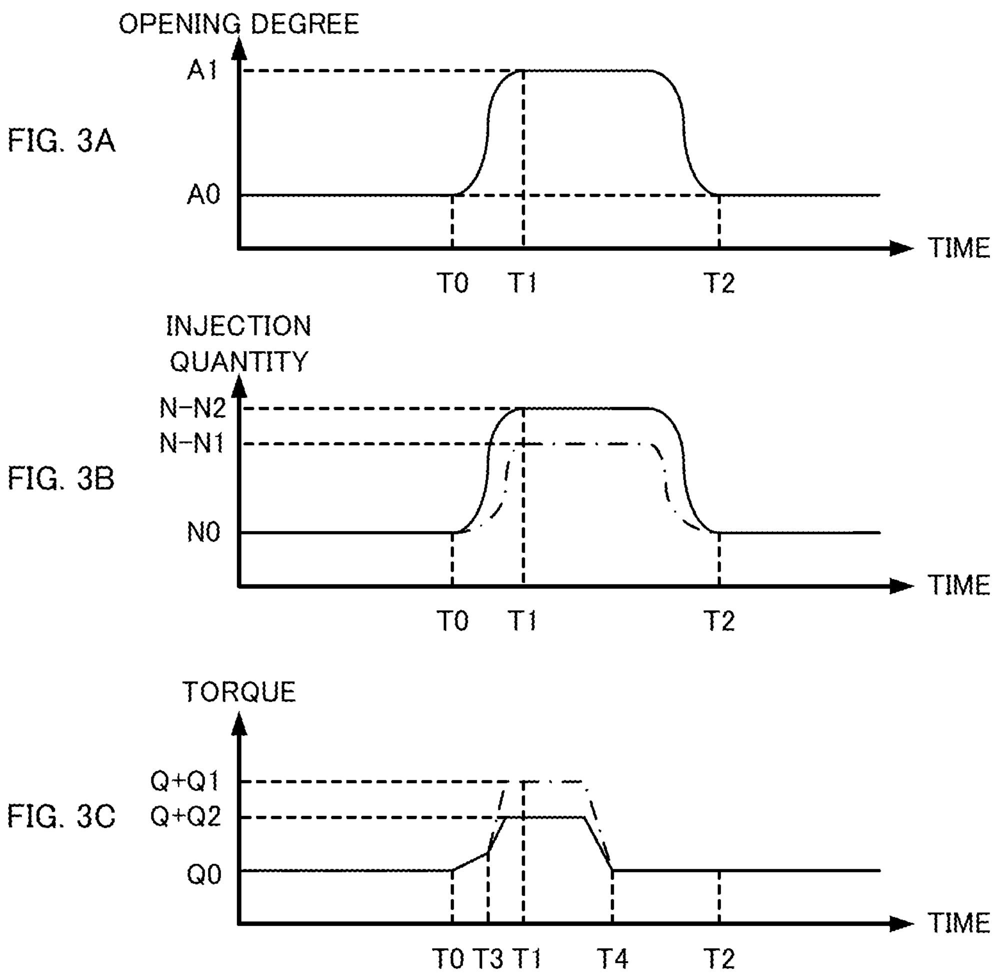
FIG. 3A shows the accelerator opening degree received by the receiving part 121.
FIG. 3B shows the fuel injection quantity of the engine 2.
FIG. 3C shows the motor torque.

FIGS. 3A, 3B, and 3C illustrate the corrected injection quantity and the corrected torque. FIG. 3A shows the accelerator opening degree received by the receiving part 121, FIG. 3B shows the fuel injection quantity of the engine 2, and FIG. 3C shows the motor torque. The horizontal axis in each of FIGS. 3A to 3C represents time, the vertical axis in FIG. 3A represents the accelerator opening degree, the vertical axis in FIG. 3B represents the injection quantity, and the vertical axis in FIG. 3C represents the torque. From a time T0 to a time T2 in FIG. 3B, a single-dotted line represents the injection quantity obtained by subtracting the first injection correction amount from the fuel injection quantity corresponding to the accelerator opening degree, and a solid line represents the corrected injection quantity. From a time T3 to a time T4 in FIG. 3C, a single-dotted line represents the torque obtained by adding the first torque correction amount to the motor torque corresponding to the accelerator opening degree, and a solid line represents the corrected torque.

As shown in FIG. 3A, the accelerator opening degree received by the receiving part 121 changes from an accelerator opening degree A0 to an accelerator opening degree A1 from the time T0 to the time T1, and is maintained at the accelerator opening degree A1 for a certain period of time after the time T1. Subsequently, as shown in FIG. 3B, the calculation part 125 calculates a corrected injection quantity "N−N2," obtained by subtracting a second injection correction amount N2 from a fuel injection quantity N corresponding to the accelerator opening degree A1. Further, as shown in FIG. 3C, the calculation part 125 calculates a corrected torque "Q+Q2" obtained by adding a second torque correction amount Q2 to a motor torque Q corresponding to the accelerator opening degree A1. The driving control device 8 causes the engine 2 to inject the fuel at the corrected injection quantity "N−N2" calculated by the calculation part 125 as the fuel injection quantity, and causes the motor 5 to generate the corrected torque "Q+Q2" as the motor torque.

The calculation part 125 operates as described above, and so the driving control device 8 causes the engine 2 to inject the fuel at the corrected injection quantity "N−N2" that is larger than the corrected injection quantity "N−N1" obtained by subtracting a first injection correction amount N1 from the fuel injection quantity N corresponding to the accelerator opening degree A1. Further, the driving control device 8 can cause the motor 5 to generate the corrected torque "Q+Q2" that is smaller than a corrected torque "Q+Q1" obtained by adding a first torque correction amount Q1 to the motor torque Q corresponding to the accelerator opening degree A1. As a result, the motor torque suitable for the amount of NOx generated corresponding to the fuel injection quantity can be generated while the vehicle is driven at the acceleration corresponding to the accelerator opening degree.

<Processing Sequence in Power Determination Apparatus 10>

Figure 4:
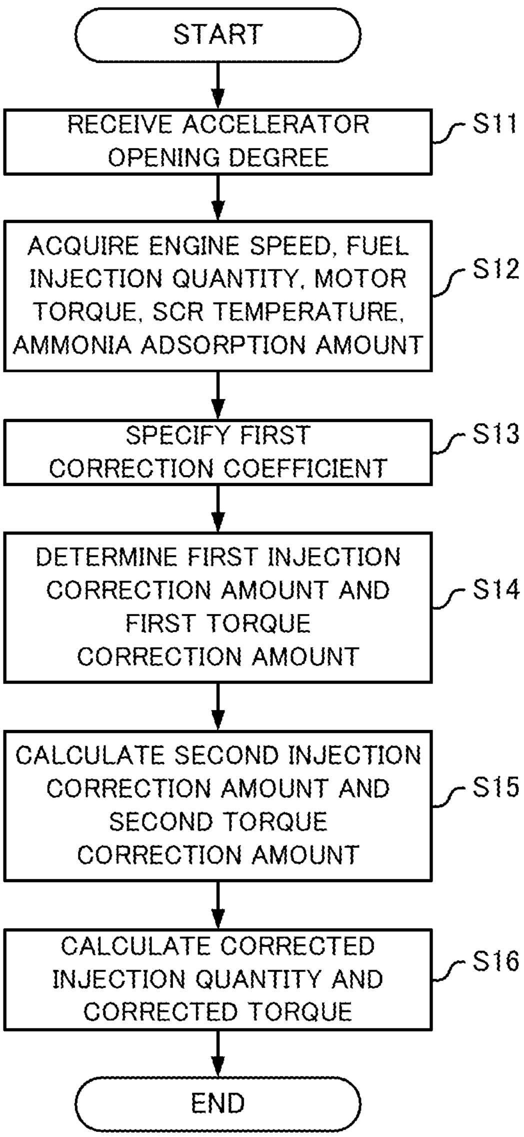
FIG. 4 is an example of a processing sequence in the power determination apparatus 10.

FIG. 4 is an example of a processing sequence in the power determination apparatus 10. The processing sequence shown in FIG. 4 shows an operation of the calculation part 125 calculating the corrected injection quantity and the corrected torque. The power determination apparatus 10 repeats the processing sequence shown in FIG. 4 at regular intervals.

First, the receiving part 121 receives the accelerator opening degree detected by the accelerator opening sensor (S11). The acquisition part 122 acquires the engine speed, the fuel injection quantity, the motor torque, and the temperature and the ammonia adsorption amount of the SCR 6, from the sensor group 7 and the driving control device 8 (S12). For example, the acquisition part 122 acquires the engine speed detected by the engine speed sensor included in the sensor group 7, the temperature of the SCR 6 detected by the temperature sensor included in the sensor group 7, and the ammonia adsorption amount based on the amount of urea water injected into the SCR 6 by the urea water injection device included in the sensor group 7. The acquisition part 122 acquires the fuel injection quantity corresponding to the accelerator opening degree and the motor torque corresponding to the accelerator opening degree, from the driving control device 8.

The specification part 124 specifies the first correction coefficient shown in the first correction coefficient map M1 in association with the temperature and the ammonia adsorption amount of the SCR 6 acquired by the acquisition part 122, by referencing the first correction coefficient map M1 stored in the storage 11 (S13). The determination part 123 determines the first injection correction amount of the fuel injection quantity and the first torque correction amount of the motor torque (S14). For example, the determination part 123 determines, as the first injection correction amount, the injection correction amount shown in the injection correction map M2 associated with the magnitude of the accelerator opening degree received by the receiving part 121 and the engine speed acquired by the acquisition part 122. The determination part 123 determines, as the first torque correction amount, the torque correction amount shown in the torque correction map M3 associated with the magnitude of the accelerator opening degree received by the receiving part 121 and the engine speed acquired by the acquisition part 122.

The calculation part 125 calculates the second injection correction amount obtained by multiplying the first injection correction amount by the first correction coefficient, and calculates the second torque correction amount obtained by multiplying the first torque correction amount by the first correction coefficient (S15). The calculation part 125 calculates the corrected injection quantity obtained by subtracting the second injection correction amount from the fuel injection quantity, and the corrected torque obtained by adding the second torque correction amount to the motor torque (S16).

<First Variation>

The above describes the operation of subtracting the second injection correction amount from the fuel injection quantity and adding the second torque correction amount to the motor torque to calculate the corrected injection quantity and the corrected torque, but the present disclosure is not limited thereto. In the power determination apparatus 10, the corrected injection quantity and the corrected torque may be calculated by further using a difference between the actual boost pressure of the turbocharger 3 and a boost pressure (hereinafter referred to as "required boost pressure") required for generating torque corresponding to the accelerator opening degree.

Figure 5:
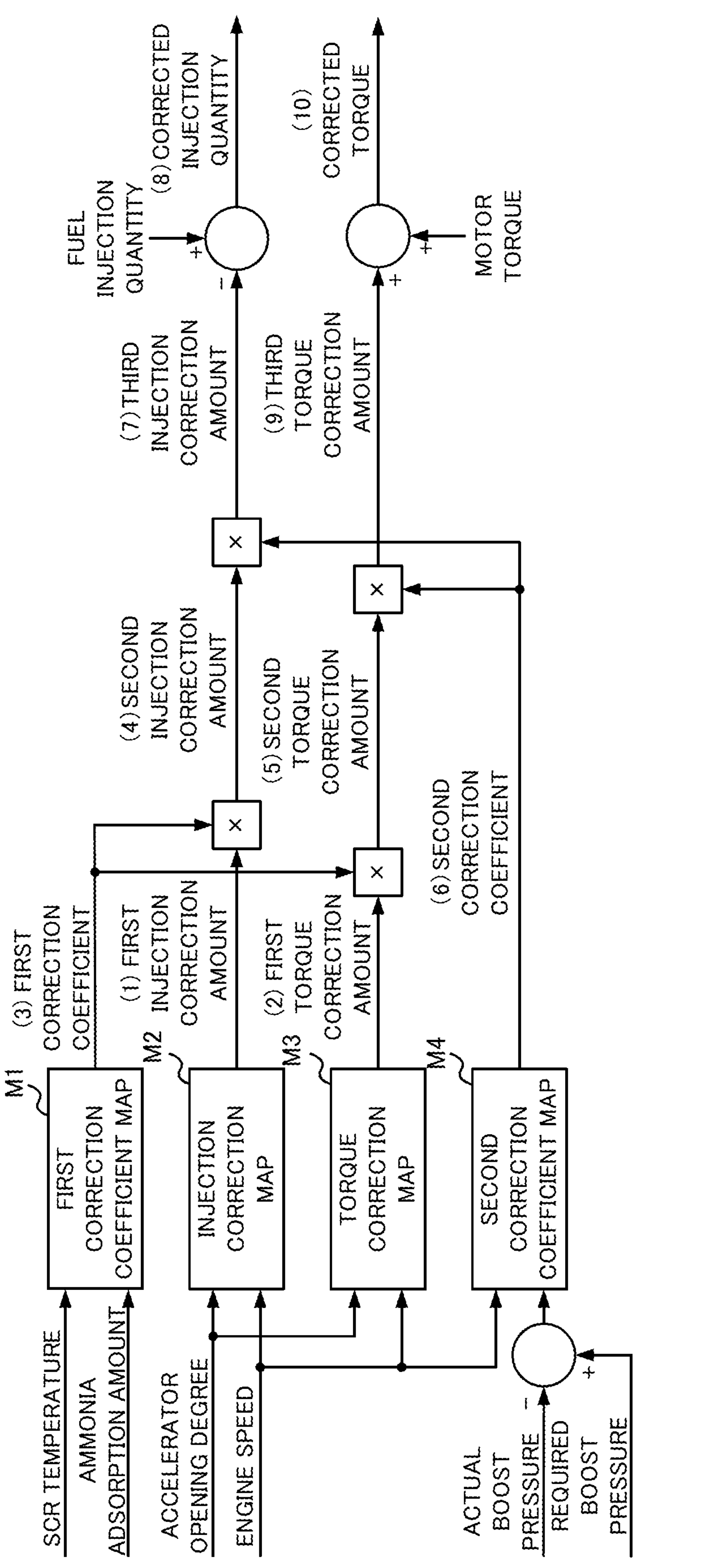
FIG. 5 illustrates an overview of a power determination apparatus 10 according to a first variation.

FIG. 5 illustrates an overview of the power determination apparatus 10 according to a first variation. The power determination apparatus 10 shown in FIG. 5 differs from the power determination apparatus 10 shown in FIG. 1 in that a second correction coefficient map M4 is used to specify the second correction coefficient ((6) shown in FIG. 5) and in that the corrected injection quantity and the corrected torque are calculated on the basis of a third injection correction amount and a third torque correction amount ((7) to (10) shown in FIG. 5).

The acquisition part 122 further acquires the actual boost pressure of the turbocharger 3 and the required boost pressure. The specification part 124 further specifies the second correction coefficient for correcting the first injection correction amount and the first torque correction amount, on the basis of i) the difference between the actual boost pressure and the required boost pressure (hereinafter referred to as "ΔBST") and ii) the engine speed ((6) shown in FIG. 5). For example, the specification part 124 specifies the second correction coefficient corresponding to ΔBST and the engine speed, by referencing the storage 11. The storage 11 stores the second correction coefficient corresponding to ΔBST and the engine speed.

Specifically, the specification part 124 first acquires the second correction coefficient map M4 stored in the storage 11. The storage 11 stores the second correction coefficient map M4, which is shown as a plane in two-dimensional space having an axis corresponding to ΔBST and an axis corresponding to the engine speed and shows a plurality of second correction coefficients associated with ΔBST and the engine speed. The second correction coefficient is a value determined by experiment or simulation. Subsequently, the specification part 124 specifies the second correction coefficient associated with ΔBST and the engine speed acquired by the acquisition part 122 among the plurality of second correction coefficients included in the second correction coefficient map M4.

The calculation part 125 calculates the corrected injection quantity ((8) shown in FIG. 5) obtained by subtracting the third injection correction amount ((7) shown in FIG. 5), which is obtained by multiplying the second injection correction amount by the second correction coefficient, from the fuel injection quantity. The calculation part 125 calculates the corrected torque ((10) shown in FIG. 5) obtained by adding the third torque correction amount ((9) shown in FIG. 5), which is obtained by multiplying the second torque correction amount by the second correction coefficient, to the motor torque.

The power determination apparatus 10 operates as described above, and so the smaller the difference between the actual boost pressure and the required boost pressure, the smaller the corrected torque can be. As a result, the amount of electric power supplied to the motor 5 can be suppressed while the vehicle is driven at the acceleration corresponding to the accelerator opening degree. Further, as the difference between the actual boost pressure and the required boost pressure increases, the corrected torque can be increased. This operation is useful i) if the delay in an increase in the amount of air intake into the engine 2 and the boost pressure of the turbocharger 3 is not acceptable even though the SCR 6 can purify NOx generated by the quantity of the injected fuel corresponding to the acceleration and ii) when the valve opening degree of the EGR device 4 provided in the vehicle is increased.

<Second Variation>

The above describes the operation in which the calculation part 125 multiplies the first injection correction amount and the first torque correction amount by the first correction coefficient and then multiplies these results by the second correction coefficient based on ΔBST and the engine speed, but the present disclosure is not limited thereto. In the power determination apparatus 10, after the first injection correction amount and the first torque correction amount are multiplied by the second correction coefficient, they may be multiplied by the first correction coefficient based on the temperature and the ammonia adsorption amount of the SCR 6.

That is, the calculation part 125 may calculate the second injection correction amount and the second torque correction amount by multiplying the first injection correction amount and the first torque correction amount by the second correction coefficient, and may then calculate the third injection correction amount and the third torque correction amount by multiplying the second injection correction amount and the second torque correction amount by the first correction coefficient.

<Third Variation>

The above describes the operation in which the calculation part 125 calculates the second injection correction amount and the second torque correction amount using one first correction coefficient specified by the specification part 124, but the present disclosure is not limited thereto. In the power determination apparatus 10, the second injection correction amount and the second torque correction amount may be calculated using a first injection correction coefficient, for correcting the first injection correction amount, and a first torque correction coefficient, for correcting the first torque correction amount.

The specification part 124 specifies, as the first correction coefficients, the first injection correction coefficient for correcting the first injection correction amount and a first torque correction coefficient, different from the first injection correction coefficient, for correcting the first torque correction amount. For example, the specification part 124 specifies the first injection correction coefficient associated with the temperature and the ammonia adsorption amount of the SCR 6 acquired by the acquisition part 122, by referencing the first injection correction coefficient map stored in the storage 11. The specification part 124 specifies the first torque correction coefficient associated with the temperature and the ammonia adsorption amount of the SCR 6 acquired by the acquisition part 122, by referencing the first torque correction coefficient map stored in the storage 11.

The calculation part 125 calculates i) the corrected injection quantity obtained by subtracting the second injection correction amount, which is obtained by multiplying the first injection correction amount by the first injection correction coefficient, from the fuel injection quantity and ii) the corrected torque obtained by adding the second torque correction amount, which is obtained by multiplying the first torque correction amount by the first torque correction coefficient, to the motor torque. The above operations of the specification part 124 and the calculation part 125 allow the value of the first injection correction coefficient and the value of the first torque correction coefficient to be respectively determined, which facilitates creation of the first correction coefficient map M1 including the first injection correction coefficient map and the first torque correction coefficient map. As a result, time required for experiment or simulation to create the first correction coefficient map M1 can be reduced.

<Effect of the Power Determination Apparatus 10>

As described above, the power determination apparatus 10 includes the determination part 123 that determines the first injection correction amount of the fuel injection quantity and the first torque correction amount of the motor torque, on the basis of the accelerator opening degree and the engine speed, the specification part 124 that specifies the first correction coefficient for correcting the first injection correction amount and the first torque correction amount, on the basis of the temperature and the ammonia adsorption amount of the SCR 6, and the calculation part 125 that calculates i) the corrected injection quantity obtained by subtracting the second injection correction amount, which is obtained by multiplying the first injection correction amount by the first correction coefficient, from the fuel injection quantity and ii) the corrected torque obtained by adding the second torque correction amount, which is obtained by multiplying the first torque correction amount by the first correction coefficient, to the motor torque.

The power determination apparatus 10 is configured in this manner, and so the power determination apparatus 10 can suppress the motor torque while the vehicle is driven at the acceleration corresponding to the accelerator stepping amount, and therefore, the amount of electric power supplied to the motor 5 can be suppressed. Further, the power determination apparatus 10 can cause the engine 2 to inject the fuel at the fuel injection quantity corresponding to the amount of generated NOx capable of being purified by the SCR 6, and therefore it is possible to suppress the amount of electric power supplied to the motor 5 to generate the motor torque suitable for the amount of NOx generated, while also suppressing the amount of NOx emissions.

The invention claimed is:

1. A power determination apparatus comprising:

a processor coupled to a memory storing instructions for the processor to function as:

a determination part that determines a first injection correction amount of a fuel injection quantity of an engine and a first torque correction amount of motor torque generated by a motor, on a basis of an accelerator opening degree and an engine speed;

a specification part that specifies a first correction coefficient for correcting the first injection correction amount and the first torque correction amount on the basis of a temperature of a catalyst and an ammonia adsorption amount of the catalyst; and a calculation part that calculates i) a corrected injection quantity, obtained by subtracting a second injection correction amount, which is obtained by multiplying the first injection correction amount by the first correction coefficient, from the fuel injection quantity and ii) a corrected torque, obtained by adding a second torque correction amount, which is obtained by multiplying the first torque correction amount by the first correction coefficient, to the motor torque, and causes the motor to generate the corrected torque that is larger than the motor torque corresponding to the accelerator opening degree, and cause the engine to inject the fuel at the corrected injection quantity smaller than a fuel injection quantity corresponding to the accelerator opening degree by outputting the calculated corrected injection quantity and corrected torque to a driving control device that controls the motor torque and a fuel injection amount of the engine.

2. The power determination apparatus according to claim 1, wherein the calculation part calculates the corrected injection quantity that is larger than an injection quantity, obtained by subtracting the first injection correction amount from the fuel injection quantity corresponding to the accelerator opening degree, and calculates the corrected torque that is smaller than a torque obtained by adding the first torque correction amount to the motor torque corresponding to the accelerator opening degree.

3. The power determination apparatus according to claim 1, comprising:

a storage that stores the first correction coefficient corresponding to the temperature and the ammonia adsorption amount of the catalyst (6), wherein the specification part specifies the first correction coefficient corresponding to the temperature and the ammonia adsorption amount of the catalyst.

4. The power determination apparatus according to claim 3, wherein the processor further function as:

an acquisition part that acquires the temperature and the ammonia adsorption amount of the catalyst, wherein the storage stores a first correction coefficient map, which is shown as a plane in two-dimensional space having the temperature and the ammonia adsorption amount of the catalyst and shows a plurality of the first correction coefficients indicating values greater than or equal to 0 and less than 1 associated with the temperature and the ammonia adsorption amount of the catalyst, and the specification part specifies the first correction coefficient corresponding to the temperature and the ammonia adsorption amount of the catalyst acquired by the acquisition part, among the plurality of first correction coefficients included in the first correction coefficient map.

5. The power determination apparatus according to claim 1, wherein the specification part further specifies a second correction coefficient for correcting the first injection correction amount and the first torque correction amount on the basis of a difference between actual boost pressure of a turbocharger and required boost pressure, which is boost pressure required for generating the torque corresponding to the accelerator opening degree, and the engine speed, and the calculation part calculates i) a corrected injection quantity, obtained by subtracting a third injection correction amount, which is obtained by multiplying the second injection correction amount by the second correction coefficient, from the fuel injection quantity and ii) a corrected torque obtained by adding a third torque correction amount, which is obtained by multiplying the second torque correction amount by the second correction coefficient, to the motor torque.

6. The power determination apparatus according to claim 5, comprising:

a storage that stores the second correction coefficient corresponding to i) the difference between the actual boost pressure and the required boost pressure and ii) the engine speed, wherein the specification part specifies the second correction coefficient corresponding to i) the difference between the actual boost pressure and the required boost pressure and ii) the engine speed, by referencing the storage.

7. The power determination apparatus according to claim 6, wherein the processor further function as:

an acquisition part that acquires the engine speed and the difference between the actual boost pressure and the required boost pressure, wherein the storage stores a second correction coefficient map, which is shown as a plane in two-dimensional space having i) an axis corresponding to the difference between the actual boost pressure and the required boost pressure and ii) an axis corresponding to the engine speed and shows a plurality of the second correction coefficients associated with i) the difference between the actual boost pressure and the required boost pressure and ii) the engine speed, and the specification part specifies the second correction coefficient associated with i) the difference between the actual boost pressure and the required boost pressure acquired by the acquisition part and ii) the engine speed, among the plurality of second correction coefficients included in the second correction coefficient map.

8. The power determination apparatus according to claim 1, wherein the specification part specifies, as the first correction coefficient, i) a first injection correction coefficient for correcting the first injection correction amount and ii) a first torque correction coefficient, which is different from the first injection correction coefficient, for correcting the first torque correction amount, and the calculation part calculates i) a corrected injection quantity, obtained by subtracting a second injection correction amount, which is obtained by multiplying the first injection correction amount by the first injection correction coefficient, from the fuel injection quantity and ii) a corrected torque, obtained by adding a second torque correction amount, which is the first torque correction amount multiplied by the first torque correction coefficient, to the motor torque.

9. A power determination method comprising:

determining a first injection correction amount of a fuel injection quantity of an engine and a first torque correction amount of motor torque generated by a motor, on a basis of an accelerator opening degree and an engine speed;

specifying a first correction coefficient for correcting the first injection correction amount and the first torque correction amount, on the basis of temperature of a catalyst and an ammonia adsorption amount of the catalyst; and calculating i) a corrected injection amount, obtained by subtracting a second injection correction amount, which is obtained by multiplying the first injection correction amount by the first correction coefficient, from the fuel injection quantity and ii) a corrected torque, obtained by adding a second torque correction amount, which is obtained by multiplying the first torque correction amount by the first correction coefficient, to the motor torque, and causing a motor to generate the corrected torque that is larger than the motor torque corresponding to the accelerator opening degree, and cause the engine to inject the fuel at the corrected injection quantity smaller than a fuel injection quantity corresponding to the accelerator opening degree by outputting the calculated corrected injection quantity and corrected torque to a driving control device that controls the motor torque and a fuel injection amount of the engine.

* * * * *